United States Patent Office 3,169,916
Patented Feb. 16, 1965

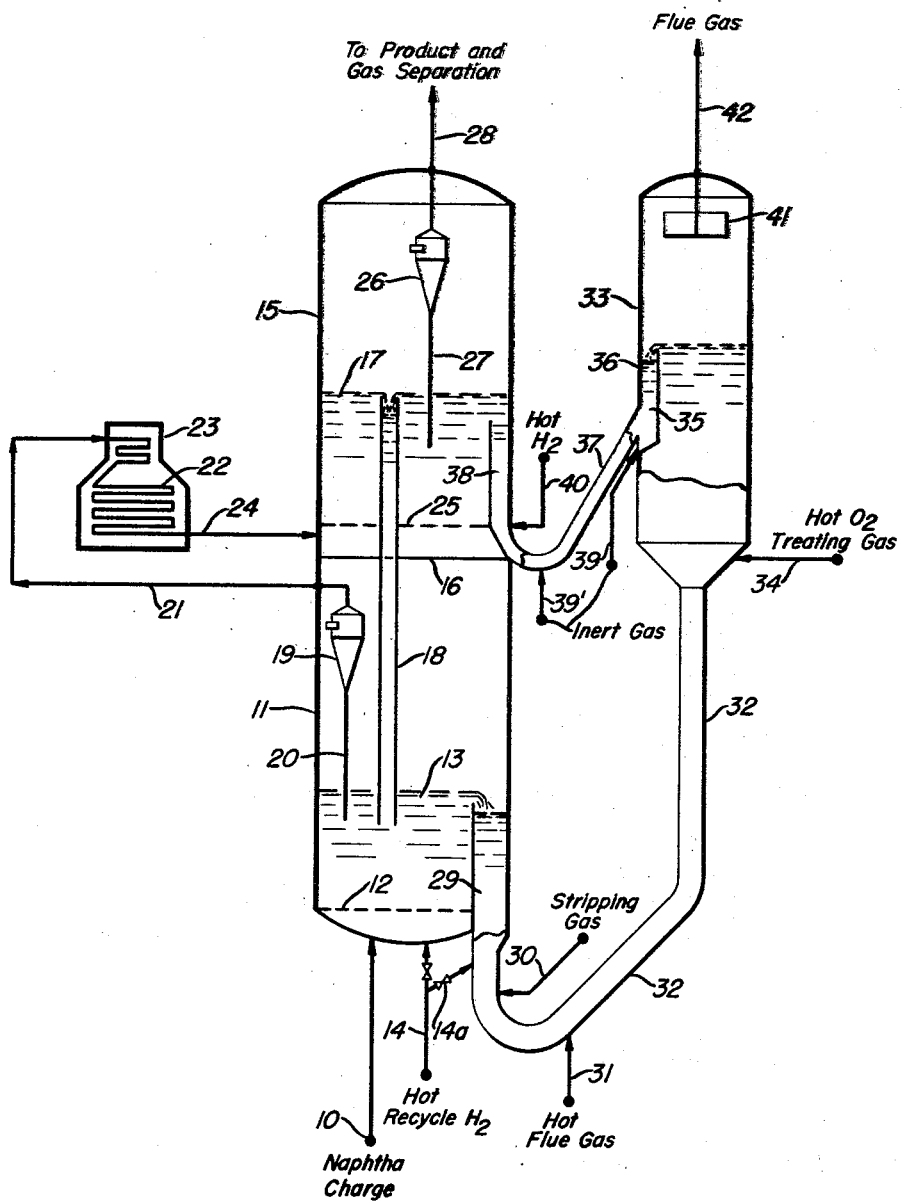

3,169,916
MULTISTAGE HYDROCARBON REFORMING WITH FLUIDIZED PLATINUM CATALYST
Robert J. Hengstebeck, Valparaiso, Ind., assignor to Standard Oil Company, Chicago, Ill., a corporation of Indiana
Filed May 19, 1953, Ser. No. 356,037
6 Claims. (Cl. 208—65)

This invention relates to an improved multistage fluidized solids contacting system and it pertains more particularly to an improved hydrocarbon conversion system for effecting conversion of hydrocarbons with fluidized platinum-containing catalyst.

For the last ten years naphtha has been reformed by a so-called hydroforming process which employed a molybdena-on-alumina or chromia-on-alumina catalyst in fixed bed operations and recently a fluid hydroformer has been developed for employing this type of catalyst. Also in recent years platinum-containing catalysts have been adopted by many refiners in fixed bed reforming operations but commercial utilization of fluid hydroforming has not been accomplished with platinum-type catalysts. An object of this invention is to provide an improved fluid system for effecting hydrocarbon reforming with platinum-containing catalysts.

The endothermic heat of reforming in the case of platinum catalysts is very much greater than the endothermic heat of reforming in the case of molybdena-on-alumina catalyst and one of the most serious problems which has confronted the art is that of supplying the necessary heat of reaction of fluidized beds of platinum catalyst. It has been proposed to supply this endothermic heat by indirect heat exchange in reactors wherein the fluidized platinum catalyst is maintained under pressures upwards of 100 p.s.i., e.g. about 200 to 300 p.s.i. or more, but no design of this type has met with commercial success. Superheating a gas or recycle stream is not desirable because of the volumes of such materials that would be required. Direct firing is impractical because of the adverse effect of high skin temperatures in the presence of catalyst and reactants. The cumbersome expedient has even been proposed of raining hot beads or pebbles through a reactor which, of course, greatly complicates the fluidized solids system and presents difficult separation and handling problems. An important objective of this invention is to provide a simple and efficient method of supplying endothermic heat of conversion to a fluidized platinum reforming system.

Platinum-on-alumina catalysts differ markedly from molybdena-on-alumina in that the latter may be regenerated hundreds of times without serious loss of catalyst activity and without a material increase in the rate of activity or selectivity decline. When platinum-on-alumina catalysts are regenerated under conditions found effective for molybdena-on-alumina catalysts the activity and selectivity decline more and more rapidly after each regeneration step so that in commercial operations a catalyst whose activity has declined beyond an economic level has been replaced with fresh catalyst. It has recently been discovered that if platinum-on-alumina catalyst which has suffered a decline in activity is not only freed from carbon by combustion with oxygen but also treated with a high partial pressure of oxygen at an elevated temperature after the carbon has been removed therefrom, a rejuvenation as well as regeneration is effected, the catalyst being thus brought back to substantially its initial activity and its initial rate of activity decline. An object of this invention is to provide a unitary system which accomplishes rejuvenation of catalyst as well as providing the required heat of conversion.

The fluidized solids contacting system of this invention includes at least two separate conversion zones with interstage heating therebetween and a separate catalyst treating zone, the catalyst being passed from the low temperature conversion zone to the treating zone wherein it is contacted with a gas of high oxygen partial pressure at a temperature upwards of about 1000° F. and then transferred to the high temperature conversion zone and back to the low temperature conversion zone. The conversion zones operate under substantially the same pressure, i.e. about 100 to 350 p.s.i.g., with the low temperature zone at sufficiently higher pressure than the high temperature zone to cause the gas stream to flow through the interstage heater without the use of a mechanical impeller. The initial zone operates at a temperature in the range of about 750 to 900° F., e.g. about 875° F., and the second or high temperature zone is preferably at least about 50° higher in temperature and in a range of about 900 to 1000° F. preferably of about 900 to 950° F. In the catalyst treating zone the temperature is preferably at least about 50° F. higher than the temperature in the high temperature conversion zone, the treatment preferably being effected with a gas containing a free oxygen partial pressure substantially above .4 atmosphere and preferably above 1 atmosphere at a temperature in the range of about 950 to 1250° F. The catalyst is preferably stripped with hydrogen before and after it is treated with the gas containing a high oxygen partial pressure.

The invention will be more clearly understood from the following detailed description of a specific example thereof read in conjunction with the accompanying drawing which forms a part of this specification and which is a schematic flow diagram of the fluidized solids contacting system for a 9,000 barrel per day fluid platinum catalyst hydroformer.

In this example the naphtha charge is a 58.2° API gravity mid-continent naphtha having an initial boiling point in ASTM distillation of 120° F., a 10 percent point of about 175° F., a 90 percent point of about 340° F. and a maximum of about 410° F. The charge contains only .05 weight percent sulfur and, in general, the sulfur content should be below about .1 percent. The charge has a clear F–1 octane number 46, F–2 octane number 45. The charge contains no olefins, about 40 percent naphthenes, 8 percent aromatics and 52 percent paraffins, all by volume. Such charge, preferably after stripping, for example with hydrogen, to remove any moisture or $H_2S$ which it might contain, is introduced by transfer line 10 at a temperature of about 950° F. and under pressure of about 205 p.s.i., into low temperature contacting vessel 11 below distributor grid 12 at the base of a fluidized bed 13 of platinum-on-alumina catalyst. Recycled hydrogen is introduced into vessel 11 through transfer line 14 also at a transfer line pressure of about 205 p.s.i. but at a temperature of about 1000 to 1300° F. If hydrogen is introduced at temperatures of the order of about 1200 to 1300° F., however, it may be desirable to introduce the naphtha charging stock vapors above grid 12 in order to avoid thremal cracking of the vapors by raising them to such high temperatures in the absence of catalyst.

The catalyst is preferably one which has been prepared by contacting an aqueous solution of chloroplatinic acid containing from about 3.5 grams of platinum per liter with an ammonium sulfide solubilizing agent for converting the platinum into a solubilized form of platinum sulfide in a stable aqueous solution, then combining this true or colloidal solution with hydrous alumina prepared as taught in U.S. Reissue 22,196, the relative amounts of the two components being such as to produce a final catalyst containing about .3 to .5 percent or more of platinum by weight on a dry $Al_2O_3$ basis, the resulting mixture being then dried and calcined. The alumina may contain up to approximately 1 percent by weight of fluorine (although it is preferably fluorine-free) and it may contain a small amount of titania but it should be substantially free from sodium, iron and molybdenum oxides since the latter have been found to poison the resulting catalyst. Other methods of preparing the alumina base may be employed but best results are obtained by using an alumina of the highest purity obtainable. Also other methods may be employed for incorporating the platinum but since these form no part of the present invention, they will not be described in further detail. The catalyst should have a particle size in the range of about 1 to 200 microns, chiefly of about 2 to 100 microns.

The contacting vessel or reactor 11 is superimposed by a second contacting vessel or reactor 15, wall 16 constituting the top of reactor 11 and the bottom of reactor 15. Each reactor is about 30 feet in height and about 14 feet in diameter suitably lined with insulating cement. The depth of fluidized catalyst bed 13 may normally be about 5 feet while the fluidized bed 17 in the upper contacting vessel 15 may be about 10 feet in depth. Catalyst flows from the upper to the lower vessel through standpipe 18 which extends through common wall 16 with its upper end adjacent the dense phase interface of bed 17 and its lower end below the dense phase interface of bed 13. The pressure head of the column of catalyst in standpipe 18 may amount to about 5 to 8 p.s.i. so that the pressure in the top of reactor 15 may be about 193 p.s.i.g. and the pressure in the top of reactor 11 may be about 200 p.s.i.g.

The partially converted product stream in the upper part of reactor 11 passes through a cyclone separation system 19 from which entrained catalyst is returned to the dense phase by dip leg 20. The substatnially catalyst-free stream then passes by line 21 through coils 22 in interstage heater 23 and then through transfer line 24 to the bottom of reactor 15 below distributor grid 25. The interstage heater in this case is designed for a $\Delta P$ or pressure drop of about 5 p.s.i. and for supplying about 20,000,000 B.t.u. per hour, the total stream entering the interstage heater at about 870° F. and leaving it at about 1025° F. In view of the pressure relationships hereinabove described no mechanical impeller is necessary for passing the partially converted stream through the interstage heater and any amount of catalyst which escapes with the stream from cyclone separator 19 is of little or no consequence and will create no erosion problem.

The product stream from the upper part of reactor 15 is withdrawn from cyclone separation system 26 so that separated catalyst may be returned by dip leg 27 to catalyst bed 17 and the product stream may be withdrawn through line 28 to a partial condenser or scrubber for removing any carryover catalyst fines. The catalyst fines thus recovered may be returned in a slurrying oil to the upper part of either of the reactors, the slurrying oil preferably being vaporized before catalyst is discharged into the reactor. A hydrogen stream is separated from reaction products and at least a part of said hydrogen stream, preferably after removing any $H_2S$ which it might contain, is reheated and returned through line 14 to the first reactor 11.

Catalyst from dense phase 13 flows into well 29 wherein it is stripped with hydrogen introduced by line 14a and then by an inert stripping gas introduced at a lower level through line 30 in order to form a seal between hydrogen and regeneration gas. The stripped catalyst is then picked up by a mixture of combustion air and hot flue gas from line 31 and carried by transfer line 32 to catalyst treating vessel 33. The oxygen concentration of gases introduced by line 31 should be sufficiently low to permit combustion of carbonaceous deposits without exceeding a safe temperature of about 1250 to 1300° F. and since the amount of carbon on the catalyst is quite low, usually below .5 percent and sometimes below .1 percent, most of the carbon can be burned from the catalyst by the time it reaches treating vessel 33 with a very low oxygen concentration in the gas introduced through line 31.

It is desirable that the catalyst be treated with a gas containing a high oxygen partial pressure in the treating vessel and also that the contacting be effected at a high temperature in the range of about 950 to 1250° F. Additional air may, therefore, be introduced through line 34 preferably at a temperature of about 950 to 1200° F., the air having been brought to such temperature by partial combustion of a portion thereof with a sulfur-free fuel or by indirect heating in a regenerative heater or any other heater known to the art. In this example the total compressed air requirements may be approximately 800 cubic feet per minute (at atmospheric pressure) and compressed to about 220 p.s.i.g. The preheating of air introduced through line 34 in this example is sufficient to maintain a temperature in treating vessel 33 of approximately 1000° F. It should be understood, however, that higher temperatures may be maintained in the treating vessel.

A dense phase level of catalyst is maintained in the treating vessel by overflow well 35 which segregates a column of catalyst 36 for transfer by trap or U-shaped line 37 to riser tube 38 which discharges into dense catalyst phase 17 in reactor 15. The catalyst in column 36 is preferably stripped with inert gas or steam introduced by lines 39 and 39' to serve as a seal between the hydrogen-containing and oxygen-containing portions of the system. Hot recycle hydrogen may be introduced by line 40 at the base of riser tube 38 for effecting any reduction which may be necessary or desirable before the catalyst reaches dense phase 17.

The regeneration and treating gases are withdrawn from the upper part of treating vessel 33 through filters 41 or other known catalyst separation systems and the flue gas is discharged through line 42. Since this flue gas is at high temperature and pressure and contains substantial amounts of uncombined oxygen, for example about 5 percent or more, its energy content is preferably utilized by injecting sufficient fuel to utilize its residual oxygen content by further combustion and the total hot high pressure gas may then be employed for driving a turbine or utilizing its energy in any other known manner.

The rate of catalyst circulation in the system is controlled by the amount of combustion air and flue gas introduced by line 31 and/or treating gas introduced by line 34. In other words, catalyst is transferred from treating vessel to reactor 15 as rapidly as it flows over wier 35 through the U-shaped seal system 36–37–38 and it overflows into standpipe 18 at substantially the same rate as it is introduced from the treating vessel. Most of the heat requirements are supplied by superheated hydrogen in the initial zone and interstage heater 23 in the second zone. A low catalyst to oil ratio may be employed, i.e. of the order of about .01:1 to .5:1.

The hydroforming of naphtha over platinum-type catalysts involves several reactions which take place more or less simultaneously. In the example herein described the partially spent catalyst is employed for effecting chiefly dehydrogenation but also some isomerization and aromatization in lower reactor 11 utilizing the heat supplied by the incoming recycled hydrogen which may be in amounts in the range of about 1000 to 8000, e.g. about 5000 cubic feet per barrel of naphtha charged, some heat being supplied by catalyst introduced from column 18 at a temperature at least about 50° higher than the temperature of fluidized bed 13. Space velocities of the order of about 1 to 10 have been found to be effective. The reheating of the partially converted product stream in the absence of catalyst supplies most of the endothermic heat of conversion required in reactor 15 which is supplied by hot catalyst introduced from treating vessel 33. In vessel 15

I preferably employ a greater amount of catalyst and longer contact time as well as higher temperature in order to insure maximum isomerization and aromatization. The two beds can be operated at the same temperature but this reduces the amount of heat that can be supplied by the interstage heater. While in this particular example the fluidized bed 13 in reactor 11 is maintained at about 875° F. and the fluidized bed 17 in reactor 15 is maintained at about 940° F., it should be understood that this example is by way of illustration and not by way of limitation.

The regeneration-rejuvenation portion of the system has been described in a simplified manner, and its should be understood that a two vessel regenerator and rejuvenator may be used with suitable stripping, aeration and safety features known to those skilled in the art of designing, building and operating pressure fluidized solids contacting systems.

The temperatures hereinabove described for effecting conversion are those suitable for platinum-on-alumina catalysts which contain no added fluorine; when such catalysts contain, for example, as much as .5 percent of added fluorine the conversion temperature may be lowered by as much as 50° F.

From the foregoing description of a specific example, it will be seen that the objects of the invention have been accomplished but it should be understood that the invention is not limited thereto since alternative arrangements of apparatus and operating conditions will be apparent from the foregoing description to those skilled in the art.

I claim:

1. The method of treating a naphtha which comprises contacting said naphtha in a lower zone at a temperature in the range of about 750 to 900° F. under a pressure of about 100 to 350 p.s.i.g. with a dense fluidized mass of a platinum-containing catalyst in the presence of recycled hydrogen for effecting a partial conversion of said naphtha, separating said partially converted naphtha from catalyst and passing said partially converted naphtha through an interstage heater for heating said naphtha to a temperature in the range of about 950 to 1050° F., contacting said heated partially converted naphtha in an upper zone with a second dense fluidized mass of platinum-containing catalyst of higher average activity than the first catalyst mass, maintaining said second catalyst mass at a temperature in the range of about 900 to 975° F. which is substantially higher than the temperature of the first catalyst mass, withdrawing catalyst from the first catalyst mass to an oxygen treating zone, contacting catalyst in said treating zone with a gas having an oxygen partial pressure greater than 1 atmosphere and at a temperature in the range of about 950 to 1250° F., introducing treated catalyst from the treating step to the second catalyst mass, introducing catalyst from said second catalyst mass as a downwardly moving column to said first catalyst mass, maintaining the upper zone at such lower pressure than the lower zone so that the pressure differential is sufficient to cause flow of the gaseous stream from the lower zone through the interstage heater to the upper zone without the use of a mechanical gas circulator and balancing the pressure differential between the upper and lower zone by the downwardly moving column of catalyst.

2. The method of supplying heat for a fluid hydroforming process in which naphtha is contacted in the presence of hot recycled hydrogen under conversion conditions with a platinum-containing catalyst which method comprises supplying heat to a first conversion zone partly by the sensible heat of catalyst introduced thereto from a second conversion zone but chiefly by sensible heat introduced with charging stock and hot recycled hydrogen, separating catalyst from the total gaseous stream leaving the first conversion zone, reheating said stream to a temperature higher than the temperature maintained in a second conversion zone and introducing said reheated stream into said second conversion zone for supplying most of the heat required therein, withdrawing catalyst from the first conversion zone to a catalyst treating zone, treating said catalyst in said treating zone with a gas containing an oxygen partial pressure of at least about 1 atmosphere while maintaining said treating zone at a temperature in the range of about 950 to 1250° F. which is higher than the temperature maintained in the second treating zone, introducing catalyst from the treating zone to the second conversion zone, circulating catalyst from the first conversion zone to the treating zone to the second conversion zone and back to the first conversion zone, maintaining the second conversion zone at sufficiently lower pressure than the first conversion zone to enable flow of the gaseous stream from the first conversion zone through the reheating zone and into the second conversion zone without the use of a mechanical gas circulator, and balancing the pressure differential between the two conversion zones by the head of a column of catalyst flowing from the second conversion zone to the first conversion zone.

3. The method of claim 2 which includes heating at least a part of the gas introduced into the treating zone in order to supplement therein the heat liberated by combustion of carbonaceous material in the treating zone.

4. In a process for hydroforming hydrocarbons in contact with a dense, fluidized catalytic mass wherein the catalyst comprises a supported noble metal, the improvement which comprises the steps of withdrawing carbonized catalyst particles from a dense fluidized bed of catalyst particles in a first hydroforming reaction zone, regenerating the withdrawn catalyst particles by treatment with an oxygen-containing gas at elevated temperatures while the catalyst particles are in the form of a confined stream, separating the regenerated catalyst particles from the regeneration gas, discharging the separated regenerated catalyst particles into a second hydroforming reaction zone, withdrawing vapors overhead from said first reaction zone and simultaneously with the said withdrawal and regeneration of the carbonized catalyst passing the vapors removed overhead from said first hydroforming zone into the bottom of said second hydroforming reaction zone, contacting the said vapors with a dense fluidized bed of said catalyst particles in said second hydroforming reaction zone for a period sufficient to complete the hydroforming reaction and withdrawing hydroformed products overhead from said second hydroforming reaction zone.

5. The process of claim 4 in which the catalyst is platinum-on-alumina.

6. The process of claim 5 in which the catalyst is 0.5 weight percent platinum-on-alumina.

References Cited in the file of this patent

UNITED STATES PATENTS

| | | |
|---|---|---|
| 2,416,730 | Arveson | Mar. 4, 1947 |
| 2,418,003 | Angell | Mar. 25, 1947 |
| 2,436,486 | Scheineman | Feb. 24, 1948 |
| 2,444,131 | Delattre-Seguy | June 29, 1948 |
| 2,450,724 | Grote | Oct. 5, 1948 |
| 2,463,741 | Byrns | Mar. 8, 1949 |
| 2,541,662 | Palmer | Feb. 13, 1951 |
| 2,618,535 | Trainer et al. | Nov. 18, 1952 |
| 2,644,785 | Harding et al. | July 7, 1953 |
| 2,643,214 | Hartwig | June 23, 1953 |
| 2,655,464 | Brown et al. | Oct. 13, 1953 |
| 2,671,102 | Jewell | Mar. 2, 1954 |
| 2,710,827 | Gornowski | June 14, 1955 |
| 2,737,473 | Hemminger | Mar. 6, 1956 |
| 2,740,750 | Howard | Apr. 3, 1956 |

UNITED STATES PATENT OFFICE
CERTIFICATE OF CORRECTION

Patent No. 3,169,916                        February 16, 1965

Robert J. Hengstebeck

It is hereby certified that error appears in the above numbered patent requiring correction and that the said Letters Patent should read as corrected below.

Column 1, line 32, for "of", second occurrence, read -- to --; column 5, line 34, after "a" insert -- first --.

Signed and sealed this 27th day of July 1965.

(SEAL)
Attest:

ERNEST W. SWIDER                        EDWARD J. BRENNER
Attesting Officer                          Commissioner of Patents